United States Patent
John Wilson et al.

(10) Patent No.: US 10,098,144 B2
(45) Date of Patent: Oct. 9, 2018

(54) RATE MATCHING OF DATA TRANSMISSION IN CONTROL RESOURCE REGION

(71) Applicant: QUALCOMM Incorporated, San Diego, CA (US)

(72) Inventors: Makesh Pravin John Wilson, San Diego, CA (US); Tao Luo, San Diego, CA (US); Taesang Yoo, Riverside, CA (US); Xiaoxia Zhang, San Diego, CA (US); Heechoon Lee, San Diego, CA (US); June Namgoong, San Diego, CA (US); Bilal Sadiq, Basking Ridge, NJ (US); Wenjun Li, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/713,536

(22) Filed: Sep. 22, 2017

(65) Prior Publication Data

US 2018/0213477 A1    Jul. 26, 2018

Related U.S. Application Data

(60) Provisional application No. 62/449,007, filed on Jan. 21, 2017.

(51) Int. Cl.
*H04W 72/12*    (2009.01)
*H04W 72/04*    (2009.01)
(Continued)

(52) U.S. Cl.
CPC ....... *H04W 72/1289* (2013.01); *H04L 1/0013* (2013.01); *H04L 1/0046* (2013.01);
(Continued)

(58) Field of Classification Search
CPC ............... H04W 48/12; H04W 72/042; H04W 72/1273; H04W 72/1289; H04W 74/006;
(Continued)

(56) References Cited

U.S. PATENT DOCUMENTS 9,313,782 B2   4/2016  Chen et al.
9,591,632 B2   3/2017  Yi et al.
(Continued)

FOREIGN PATENT DOCUMENTS

EP    2406898 A2    1/2012

OTHER PUBLICATIONS

Intel Corporation: "Physical Downlink Control Channel Design for NR", 3GPP Draft, R1-1700359 Intel NR DL Control, 3rd Generation Partnership Project (3GPP), Mobile Competence Centre, 650, Route Des Lucioles, F-06921, Sophia-Antipolis Cedex, France, vol. RAN WG1, No. Spokane, USA, 20170116-20170120, Jan. 16, 2017 (Jan. 16, 2017), XP051207896, 5 Pages, Retrieved from the Internet: URL:http://www.3gpp.org/ftp/Meetings_3GPP_SYNC/RAN1/Docs/ [retrieved on Jan. 16, 2017].
(Continued)

*Primary Examiner* — Ashley Shivers
(74) *Attorney, Agent, or Firm* — Arent Fox LLP

(57) ABSTRACT

A control resource region of an New Radio system slot structure may be separated into control resource sets, only some of which may be used for control transmissions. Aspects presented herein improve the efficient utilization of resources by enabling data transmission in resources of the DL control resource region and/or the UL control resource region. A UE receives an indication of a control resource set in a control resource region of a slot that may provide a control channel resource or a data channel resource and performs rate matching for data transmissions in the data channel based at least in part on the indication. The indica-
(Continued)

tion may be a semi-static indication, e.g., RRC signaling, of the control resource set.

22 Claims, 11 Drawing Sheets

(51) Int. Cl.
  *H04W 28/22* (2009.01)
  *H04W 52/02* (2009.01)
  *H04L 1/00* (2006.01)
  *H04L 5/00* (2006.01)

(52) U.S. Cl.
  CPC .......... *H04L 5/0053* (2013.01); *H04L 5/0092* (2013.01); *H04W 28/22* (2013.01); *H04W 52/0216* (2013.01); *H04W 72/042* (2013.01); *H04W 72/1273* (2013.01); *H04W 72/0446* (2013.01)

(58) Field of Classification Search
  CPC ......... H04W 72/0413; H04W 72/1268; H04W 72/1284; H04W 74/004; H04W 28/22
  See application file for complete search history.

(56) References Cited

U.S. PATENT DOCUMENTS

| | | | |
|---|---|---|---|
| 2008/0298477 A1 | 12/2008 | Classon | |
| 2009/0181690 A1* | 7/2009 | McCoy | H04L 5/0007 455/452.1 |
| 2010/0056197 A1* | 3/2010 | Attar | H04L 1/0026 455/522 |
| 2013/0034074 A1* | 2/2013 | Ihm | H04B 7/026 370/329 |
| 2013/0051354 A1* | 2/2013 | Ling | H04L 1/0067 370/329 |
| 2015/0092710 A1* | 4/2015 | Novlan | H04W 72/1278 370/329 |
| 2016/0050667 A1* | 2/2016 | Papasakellariou | H04W 74/0808 370/329 |
| 2016/0095093 A1 | 3/2016 | Yi et al. | |
| 2017/0048019 A1 | 2/2017 | Soong et al. | |
| 2017/0064680 A1 | 3/2017 | Chen et al. | |
| 2017/0201968 A1* | 7/2017 | Nam | H04W 72/042 |
| 2017/0325260 A1* | 11/2017 | Guo | H04W 74/006 |
| 2018/0063865 A1* | 3/2018 | Islam | H04W 76/27 |

OTHER PUBLICATIONS

International Search Report and Written Opinion—PCT/US2018/014222—ISA/EPO—dated Jun. 27, 2018.
Nokia et al., "Dynamic Reuse of DL Control Resources for Data in NR", 3GPP Draft, R1-1701012_Dynamic Reuse of Control Resources_Final, 3rd Generation Partnership Project (3GPP), Mobile Competence Centre, 650, Route Des Lucioles, F-06921 Sophia-Antipolis Cedex, France vol. RAN WG1, No. Spokane, WA, USA, 20170116-20170120, Jan. 16, 2017 (Jan. 16, 2017), XP051208527, 4 Pages, Retrieved from the Internet: URL:http://www.3gpp.org/ftp/Meetings_3GPP_SYNC/RAN1/Docs/ [retrieved on Jan. 16, 2017].
Qualcomm Incorporated: "Downlink Control Channel Design for Shortened TTI", 3GPP Draft, R1-1611638 DL Control Channel Design for Shortened TTI, 3rd Generation Partnership Project (3GPP), Mobile Competence Centre, 550, Route Des Lucioles, F-06921 Sophia-Antipolis Cedex, FRA vol. RAN WG 1, No. Reno, Nevada, USA, 20161114-20161118, Nov. 13, 2016 (Nov. 13, 2016), XP051175611, 9 Pages, Retrieved from the Internet: URL: http://www.3gpp.org/ftp/Meetings_3GPP_Sync/RAN1/Docs/ [retrieved on Nov. 13, 2016].

\* cited by examiner

RATE MATCHING OF DATA TRANSMISSION IN CONTROL RESOURCE REGION

CROSS-REFERENCE TO RELATED APPLICATION

This application claims the benefit of U.S. Provisional Application Ser. No. 62/449,007, entitled "Rate Matching of Data Transmission in Control Region" and filed on Jan. 21, 2017, which is expressly incorporated by reference herein in its entirety.

BACKGROUND

Field

The present disclosure relates generally to communication systems, and more particularly, to uplink (UL) rate matching and downlink (DL) rate matching for transmissions in a control resource region of a slot.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An NR slot structure may comprise a control resource region and a data resource region. For example, an UL centric slot may comprise a DL control resource region and an UL control resource region. Similarly, a DL centric slot may comprise a DL control resource region and an UL control resource region. The DL control resource region of the slots may span one or a few OFDM symbols at the beginning of the slot and may be used for control signaling from an base station to a UE. The UL control resource portion may span one or a few OFDM symbols at the end of the slot and may be used for UL control transmissions from the UE to the base station. A control resource region may be separated into subbands or control resource sets. The separation of the DL control resource region into subbands/control resource sets, e.g., enables the UE to monitor only a few resource sets/subbands rather than monitoring the entire bandwidth of the DL control resource region. This provides power savings at the UE by allowing the UE to avoid opening up its radio frequency (RF) to a wide bandwidth in order to receive control information.

At times, only a portion of the control resource sets in the DL control resource region or the UL control resource region might be used for control transmissions. The portions of control resource sets may also be referred to as control resource subsets. Aspects presented herein improve the efficient utilization of resources by enabling data transmission in unused resources of the DL control resource region and/or the UL control resource region.

In an aspect of the disclosure, a method, a computer-readable medium, and an apparatus are provided for wireless communication at a UE. The apparatus receives an indication of a control resource set in a control resource region of a slot that may comprise a control channel resource or a data channel resource. The control resource region may comprise a plurality of control resource sets configured to provide control information. The indication may comprise semi-static signaling, e.g., RRC signaling indicating a semi-static bitmap of resource set utilization. The apparatus performs at least one of UL rate matching and DL de-rate matching for data transmissions in the data channel based at least in part on the indication. The apparatus may further receive dynamic signaling of resources for which the apparatus should perform rate matching in accordance with the semi-static indication, e.g., via DCI accompanying a grant of data channel resources. The apparatus may receive UE-specific signaling identifying the control resource set for which the UE should perform rate matching. The apparatus may further use the dynamic signaling and/or grant in order to perform the UL rate matching or DL de-rate matching.

In another aspect of the disclosure, a method, a computer-readable medium, and an apparatus are provided for wireless communication at a base station. The apparatus transmits an indication of one or more control resource sets in a control resource region of a slot that may comprise a control channel resource or a data channel resource, wherein the control resource region comprises a plurality of control resource sets configured to provide control information and data. The apparatus transmits data within the control resource set in the control resource region of the slot based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
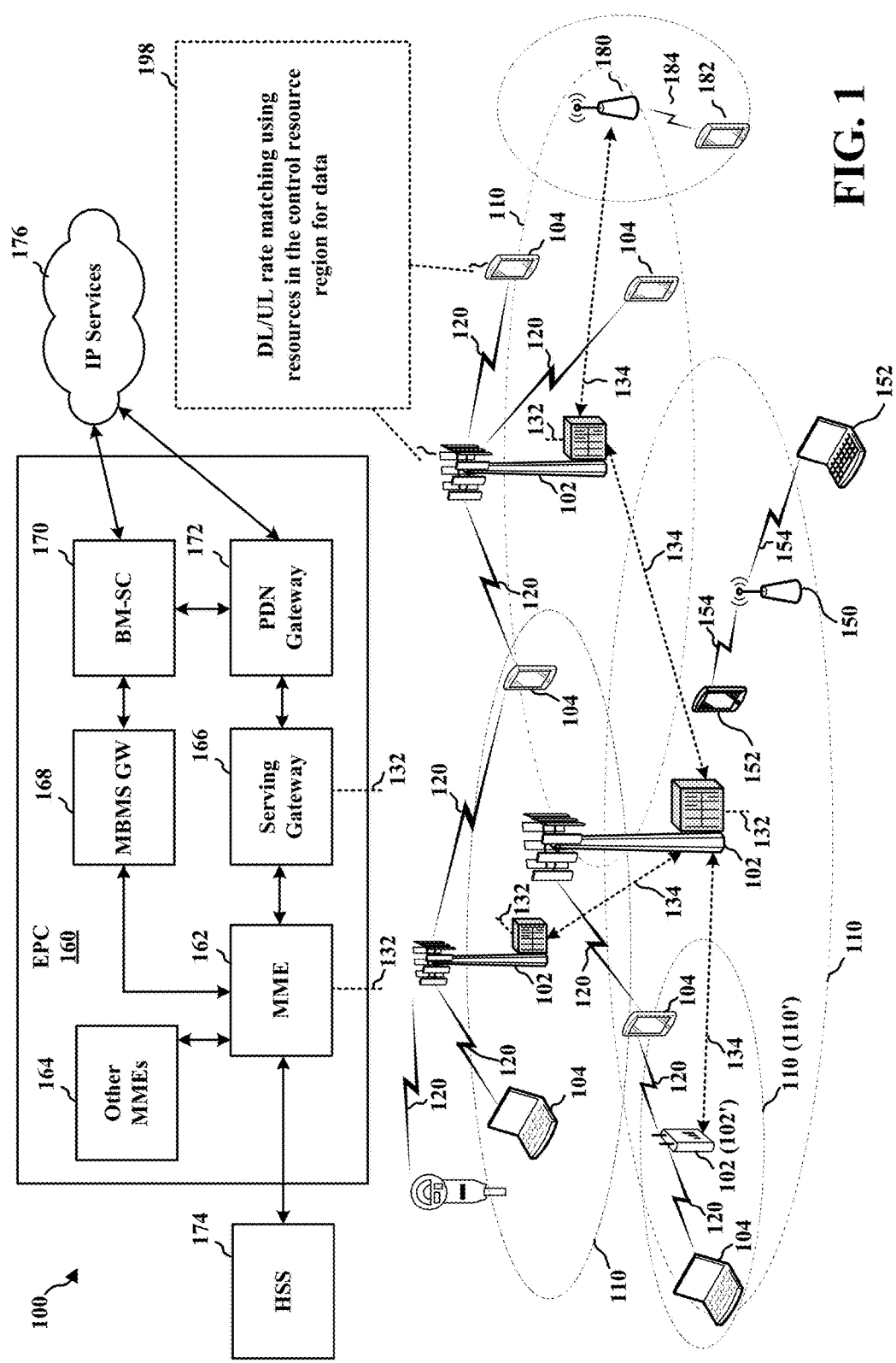
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 1052 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies.

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may perform UL or DL rate matching 198 for data transmissions in a control resource region of a slot, e.g., as described in connection with FIGS. 4-11.

Figure 2:
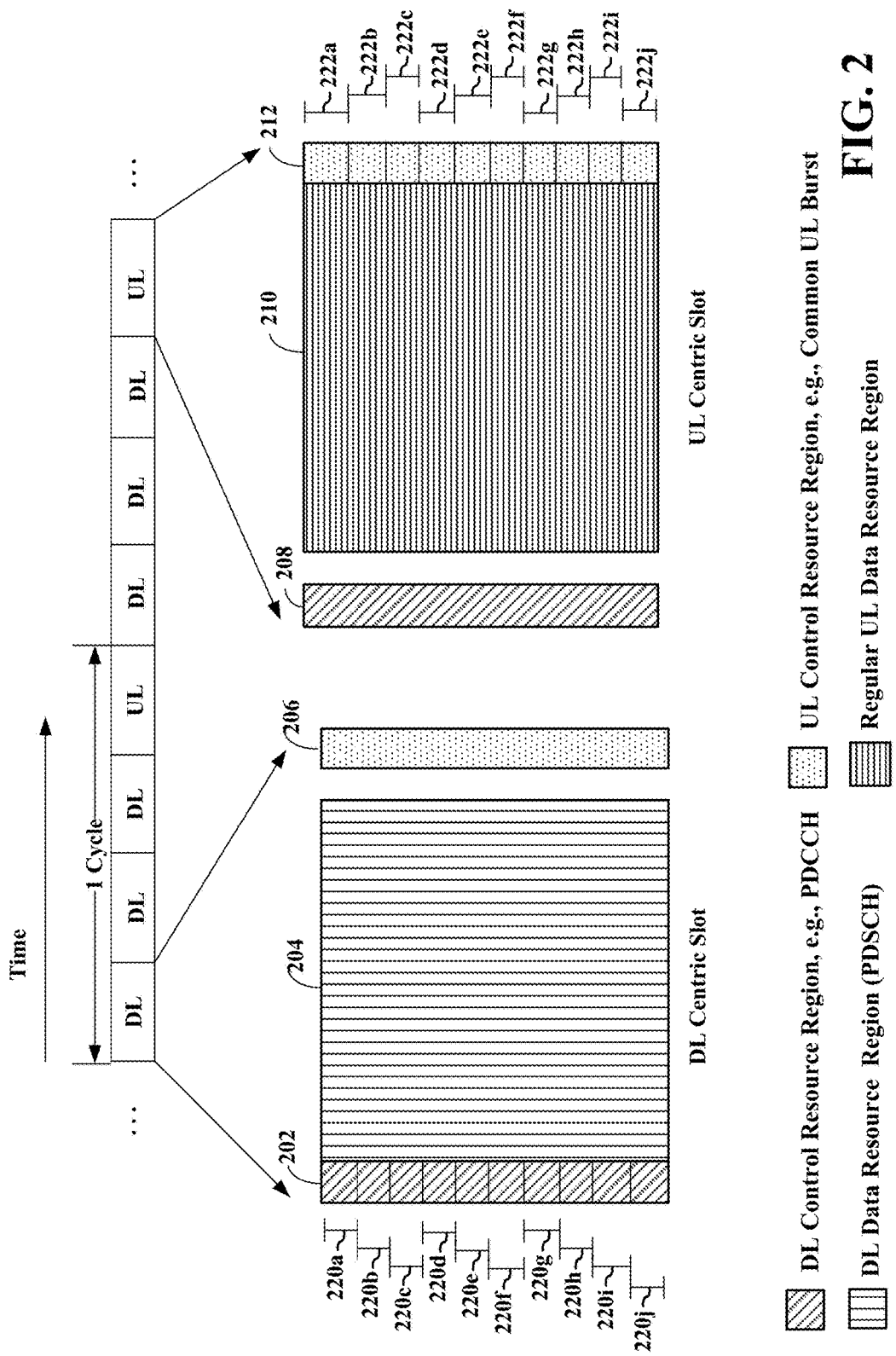
FIG. 2 illustrates an example slot structure for UL centric slots and DL centric slots, in accordance with aspects presented herein.

FIG. 2 illustrates an example slot structure comprising DL centric slots and UL centric slots. In NR, a slot may have a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 2 illustrates an example DL centric slot. The DL centric slot may comprise a DL control resource region 202, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A DL control resource region 202, 208 may span one or a few OFDM symbols, e.g., at the beginning of the slot. The DL control resource region 202, 208 may comprise multiple subbands, e.g., 220a-j illustrated for DL control resource region 202. Each subband 220a-j may comprise a control resource set that spans only a portion of the control resource region 202 rather than the entire bandwidth. FIG. 2 illustrates the control resource region 202 having 10 subbands. This is only an example, and any number of subbands may be comprised in the control resource region. Additionally, FIG. 2 illustrates the subbands 220a-j having a similar size. However, in other examples, the sizes of the subbands 200a-j may be different for different subbands. DL control resource region 208 may similarly comprise multiple subbands. The subbands for DL control resource region 202 of a DL centric slot may be the same as for DL control resource region 208 of an UL centric slot. In another example, the subbands may be different between the DL centric slot and the UL centric slot.

The separation of the control resource region 202, 208 into subbands enables a UE to monitor only a few resource sets/subbands rather than monitoring the entire bandwidth of the control resource region 202, 208. This provides power savings at the UE by allowing the UE to monitor a smaller bandwidth in order to receive control information.

A base station may use the control resource sets of the control resource region 202, 208 to transmit common control transmissions from the eNB. For example, the base station may broadcast a physical broadcast channel (PBCH) that is cell specific and applies to multiple UEs. The PBCH may carry a master information block (MIB). The MIB may carry information such as the number of RBs in the DL system bandwidth and a system frame number (SFN). A base station may also use the control resource sets of the control resource region 202, 208 to transmit UE specific control signaling, e.g., via RRC, etc. The signaling may be specific to a single UE. Other UEs might not be aware of the resources used to transmit UE specific control signaling. Thus, the control resource sets may comprise at least one common resource set, e.g., subband, used for common control transmissions and possibly one or more UE specific resource set, e.g., subband, used for UE specific control transmissions.

At times, only a portion of the control resource sets, e.g., subbands 220a-j, might be used for control transmissions. Aspects presented herein improve the efficient utilization of resources by enabling data transmission in unused resources of the DL control resource region 202, 208.

The DL centric slot may comprise a DL data resource region 204, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 206 in which UEs may send UL control channel information or other time sensitive or otherwise critical UL transmissions. This ULCB region may also be referred to as an UL control resource region 206.

The UL control resource region 206 of the DL centric slot, and similarly, the UL control resource region 212 of the UL centric slot may be subdivided into control resource sets, e.g., subbands 222a-222j. FIG. 2 illustrates the UL control resource region 206, 212 having 10 subbands. This is only an example, and any number of subbands may be comprised in the control resource region. Additionally, FIG. 2 illustrates the subbands 222a-j having a similar size. However, in other examples, the sizes of the subbands 222a-j may be different for different subbands. The subbands for UL control resource region 206 of a DL centric slot may be the same as for UL control resource region 212 of an UL centric slot. In another example, the subbands may be different between the UL centric slot and the DL centric slot. Additionally, in FIG. 2, the subbands for the DL control resource regions 202, 208 and the UL control resource regions 206, 212, are illustrated as having the same subbands. In other examples, different subbands may be provided for DL control resource regions 202, 208 than are provided for the UL control resource regions 206, 212.

A UE may transmit physical uplink control channel (PUCCH), sounding reference signals (SRS), physical random access channel (PRACH), etc. in the UL control resource regions 206, 212. The SRS may be used by a base station for channel quality estimation to enable frequency-dependent scheduling on the UL. The PRACH may be included within one or more slots within a slot structure based on the PRACH configuration. The PRACH allows the UE to perform initial system access and achieve UL synchronization. The UL control resource region 206, 212 may comprise a PUCCH that carries uplink control information (UCI), such as scheduling requests, a channel quality indicator (CQI), a precoding matrix indicator (PMI), a rank indicator (RI), and HARQ ACK/NACK feedback.

At times, only a portion of the subbands 222a-j might be used for control transmissions. Aspects presented herein improve the efficient utilization of resources by enabling data transmission in unused resources of the UL control resource region 206, 212.

Similar to the DL centric slot, the UL centric slot may comprise a DL control resource region 208, e.g., for PDCCH transmissions. The DL control resource region 202, 208 may comprise a limited number of symbols at the beginning of a slot. The UL centric slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL data region 210 may be referred to as a UL regular burst (ULRB) region.

The UL centric slot may comprise a guard band between the UL data region 210 and the ULCB 212. For example, the guard band may be based on the base station's capabilities and used to reduce interference when the UL data region 210 and the ULCB have different numerologies (symbol periods, slot lengths, etc.). The DL control resource region 202, 208 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB 210.

Figure 3:
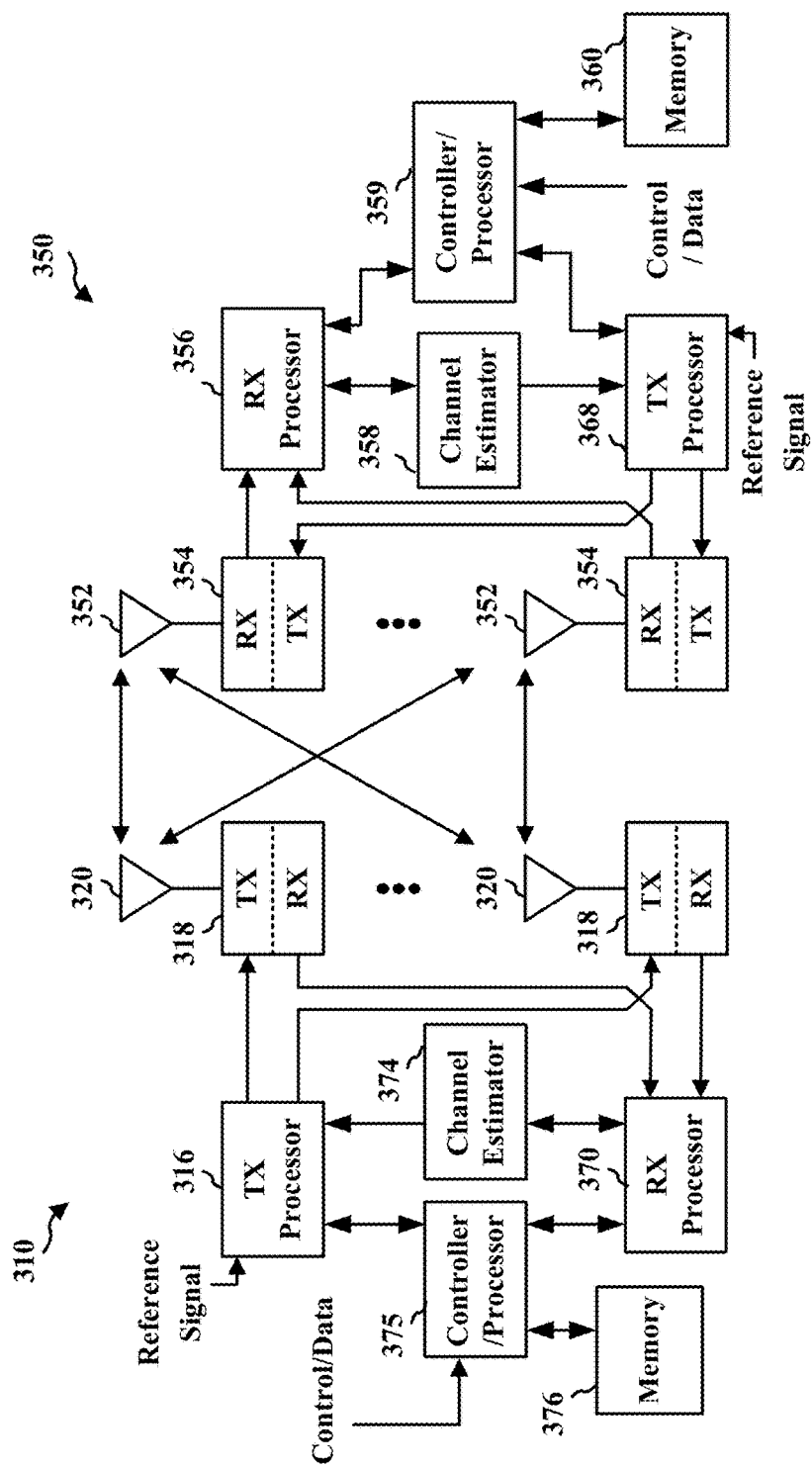
FIG. 3 is a diagram illustrating an example of a base station and user equipment (UE) in an access network.

FIG. 3 is a block diagram of base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
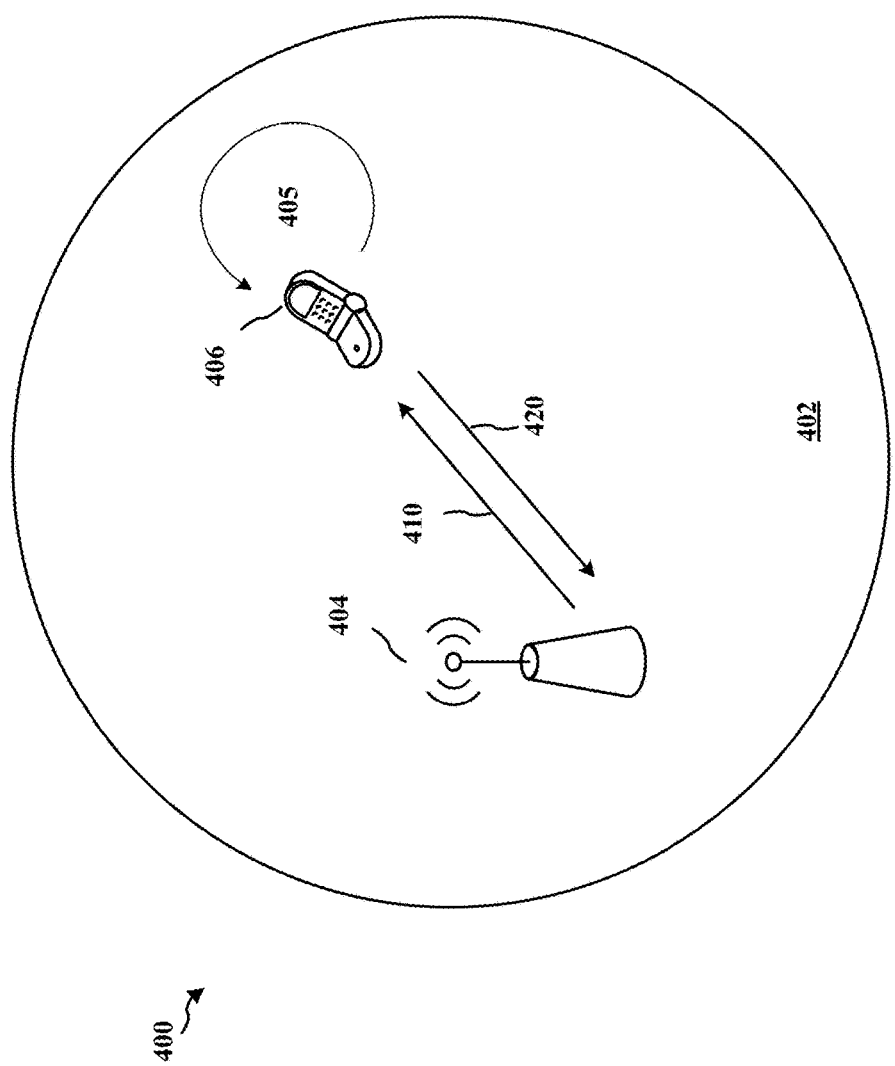
FIG. 4 is a diagram of a communications system in accordance with aspects presented herein.

FIG. 4 is a diagram of an example NR communication system 400. The NR communications system 400 may include a base station 404 (e.g., base station 102, 180, 310, 404, 750, apparatus 1002, 1002') in communication with a UE 406 (e.g., UE 104, 350, 406, 702, 702', 1050) located in cellular region 402. The base station 404 and UE 406 may communicate using a slot structure, as described in connection with FIG. 2.

For example, base station may transmit DL communication 410, including control transmissions and data transmissions, as described in connection with FIGS. 2 5, 6, and 9. The base station 404 may transmit DL control transmissions within a DL control resource region, e.g., 202, 208 of a slot. The base station may transmit DL data transmissions within a DL data region 204 of a DL centric slot. As described herein, the base station may also improve the efficient use of resources by transmitting DL data to UE 406 in unused resources, whether control resource sets or resource elements within a control resource set, in the control resource region 202, 208 of a slot.

UE 406 may transmit UL communication 420, including control transmissions and data transmissions, as described in connection with FIGS. 2 5, 6, and 9. The UE 406 may transmit UL control transmissions within an UL control resource region, e.g., 206, 212 of a slot. The UE may transmit UL data transmissions within an UL data region 212 of an UL centric slot. As described herein, the UE may also improve the efficient use of resources by transmitting UL data to base station 404 in unused resources, whether control resource sets or resource elements within a control resource set, in the control resource region 206, 212 of a slot.

Thus, the UE 406 may perform rate matching 405, including DL rate matching and/or UL rate matching, due to the transmission of data within a control resource region 202, 206, 208, 212 of a slot.

DL rate matching may comprise receiving and decoding the data transmission from the base station. Thus, DL rate matching may also be referred to interchangeably herein as "de-rate" matching, as the UE is using the information to determine a transmission rate for decoding a transmission from the base station. By determining the resources of the control resource region that the base station may use to transmit data enables the UE to use rate matching to decode the data transmission, including determining in which resources the DL data transmission will be transmitted. In rate matching, the UE or base station adapts a code rate of a transmission such that the number of information and parity bits to be transmitted matches the resource allocation. Thus, if additional resources are available through the use of resource sets in the control resource region, the code rate may be adjusted accordingly. De-rate matching involves the reciprocal process by which, with knowledge of a resource allocation, e.g., which may include bits in a control resource set of a control resource region when available, a UE is able to decode a transmission from the base station.

UL rate matching may comprise determining the transmission rate for the data based on the available resources. When resources in the control resource region, e.g., unused control resource set or unused control elements within a control resource set, are available for use to transmit data, the UE adjusts the transmission rate and transmits at least part of the data transmission in the available resources of the control resource region.

For DL Rate Matching, the base station 404 may signal the UE regarding resources within the control resource region 202, 208 that may be used for data in addition to the resources in the data region 204, 210.

In another example, certain symbols may be defined to include data as well as control transmissions. For example, the first two OFDM symbols may be defined to potentially include data.

Figure 5:
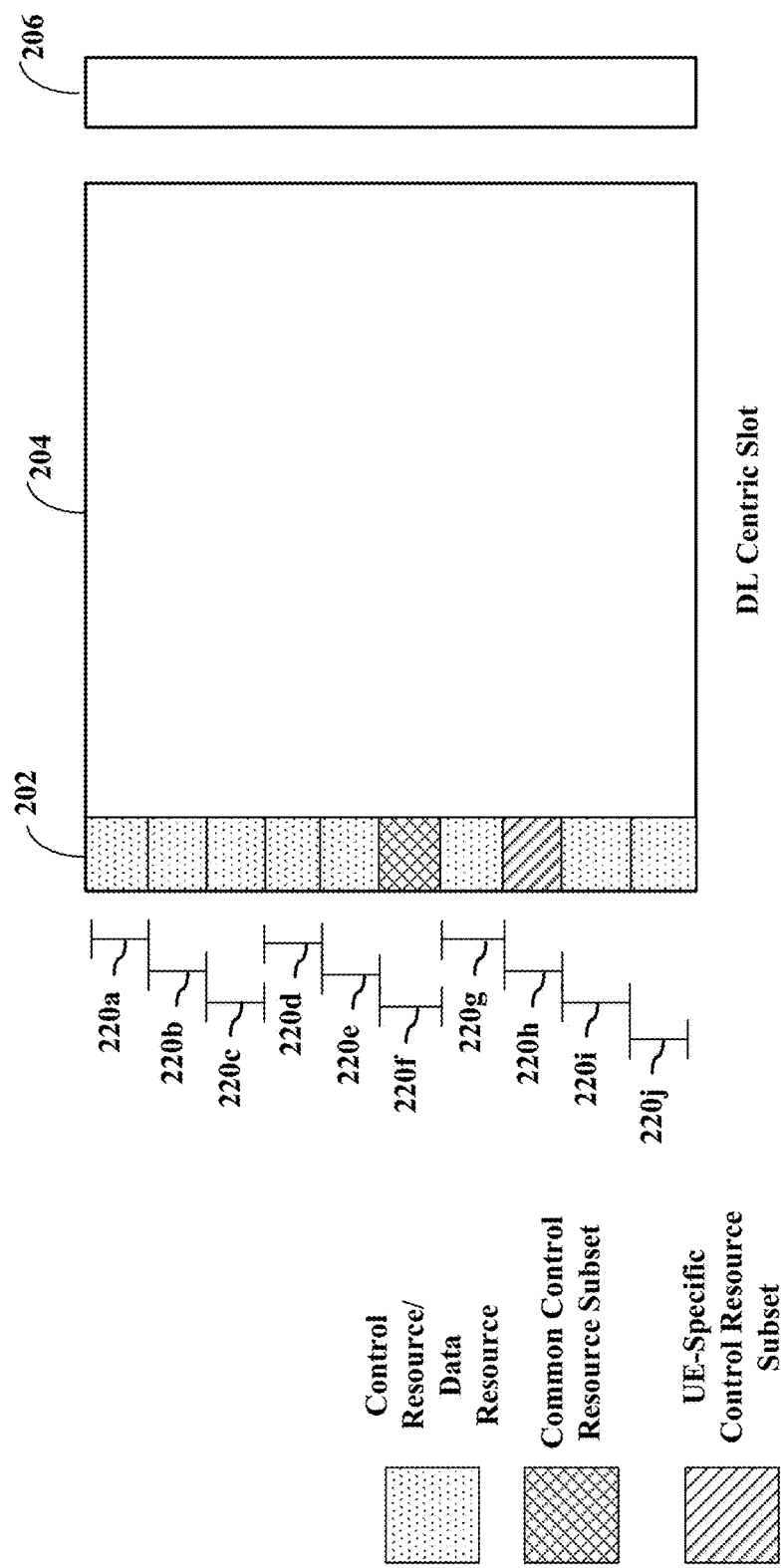
FIG. 5 illustrates an example slot structure, in accordance with aspects presented herein.

When the base station signals the UE downlink data, e.g., a PDSCH resource using control region resources, the DL rate-matching 405 performed at the UE may be based on a number of options. In a first example, the base station 404 may define a set of resources within the control resource region 202, 206, 208, 212 which can be dynamically rate-matched around. For example, the base station may signal the defined set of resources using a layer 1 control channel in order to indicate to the UE which symbols and REs in the control resource region of a slot may contain control channel resources or data channel resources. For example, the base station may define a bit mask, where each bit in the mask indicates a control resource set in the symbols may carry data channel resources. This indication may be transmitted in semi-static signaling from base station 404 to UE 406. FIG. 5 illustrates an example configuration for a bit mask for a DL centric slot corresponding to the DL centric slot of FIG. 2. In this example, the bit mask for the DL control resource region 202 may indicate that control resource sets, e.g., subbands 220a, 220b, 220c, 220d, 220e, 220g, 220i, and 220j, may comprise control or data transmissions, while subband 220f is reserved/allocated for common control transmissions and subband 220h is reserved/allocated for UE-specific control transmissions.

When scheduling the UE 406 for DL data, the base station may indicate the set of resources within the semi-static bitmap are resources for rate matching around by the UE, e.g., which of control resource sets 220a, 220b, 220c, 220d, 220e, 220g, 220i, and 220j may comprise data for the UE. Thus, the UE may perform rate matching using both the semi-static indication received from the base station and additional dynamic signaling from the base station.

Although the resource information may be sent completely in dynamic signaling without the semi-static signaling, this may require additional transmission resources to be used by the base station, for instance in PDCCH that might have a limited capacity of bits, to communicate this information to each UE. The use of semi-static signaling of a set of potential resources and then dynamic signaling of which of the potential resources are applicable reduces the resources needed for the dynamic signaling.

Thus, the semi-static signaling may comprise a configuration that changes less frequently than the dynamic signaling configuration. For example, the semi-static configuration may change every 80 ms, whereas the dynamic may change every ms or every 250 μs. In one example, a PBCH bandwidth once fixed may comprise CRS spanning the entire bandwidth 20 Mhz without further down selection that CRS will span only 10 Mhz. Another example may comprise, e.g., CQI reporting periodicity that, once configured, does not allow further down selection. In a different example, the semi-static configuration may comprise potential data regions that can be used. For example, the base station may be confident that over a few ms a few control resource sets will not comprise control signaling. The dynamic signaling may reference a very small time frame.

The UE may perform rate matching such that the UE always rate matches around the common resource set, e.g., in subband 220*f* in FIG. 5. Rate matching around the common resource set includes subtracting out the resource elements of the common resource set 220*f* from a resource allocation before performing DL rate matching, for example.

In another example, the UE may perform the rate matching without dynamic signaling from the base station. In this example, the UE may infer which resources may comprise data from the base station in order to perform the DL rate matching. In an example involving communication over the unlicensed spectrum, e.g., Shared Spectrum or small cell communication, the base station may be scheduling just one UE, in which case it would be very useful to reuse the unused portions of the control resource region for data transmission. Thus, a UE may use a rule that indicates that if an RB allocation to the UE from the base station spans the entire bandwidth, then the UE may assume that the PDSCH spans the control resource region, except for common control resource, e.g., 220*f*. This behavior at the UE may be enabled via RRC signaling. Once enabled, no additional dynamic signaling may be required.

In another example, a mode may be defined in which that PDSCH can always rate match around a configured common control resource set, e.g., 220*f*, and UE-specific control resource set, e.g., 220*i*. This mode may be enabled/disabled at the UE via RRC signaling from the base station.

"Rate match around" means to determine a transmission rate, whether for transmitting UL transmissions or for receiving DL transmissions, excluding certain resources. Thus, when the UE rate matches around a common control resource set, the UE may determine a transmission rate excluding the resources of the common control resource set. Thus, the excluded resources are excluded for data transmission. The exclusion is not only used to determine a transmission rate, but also for data processing, meaning the common resource set will not be used for data transmission.

In another example, a UE may always rate match around the configured common control resource set, e.g., 220*f*, e.g., including determining a resource allocation by excluding the common control resource set. For the remaining resources of the control resource region 202, 206, 212, 216, the UE may rely on semi-static and/or dynamic signaling from the base station.

In another example, a set of symbols having such rate-matching behavior can be signaled to UE using RRC or broadcast channels.

The rate matching may be extended according to slot aggregation having a same configuration, e.g., in which the UE has a same grant. In examples in which multiple slots have a same configuration, e.g., grants, the UE may perform rate matching independently for each of the slots. In another example, the UE may apply a common rate matching determination for multiple slots in which the UE has a same grant. For example, the UE may apply the rate matching determination in a first slot and may apply the same rate matching behavior for each slot in which the UE has a same grant. In another example, the UE may determine to rate match around only common control resources for each slot in which the UE has a same grant. In another example, the UE may determine to rate match around only UE Specific control resources for each slot in which the UE has a same grant. In another example, the UE may determine to rate match around both common control resources and UE specific resources in each slot in which the UE has a same grant. In yet another example, the UE may determine to utilize the entire control resource region for data in each slot in which the UE has a same grant.

The UE 406 may similarly perform UL rate matching, e.g., to transmit UL data in an UL control resource region 206, 212. For example, the base station 404 may signal the UE 406 regarding UL data, e.g., PUSCH resource, including symbols having both control and/or SRS and data. The last few symbols, e.g., 206, 212, in a slot may be used to transmit uplink control channel and/or PUSCH.

Similar to the signaling regarding resources for DL rate matching, the base station 404 may signal to the UE a set of resources which can be dynamically rate-matched around. This may be signaled from the base station to the UE by layer 1 control channel for symbols that may contain both a control channel resource and a data resource. The base station may define a bit mask and each bit in the mask may indicate a set of resources in the symbols may have both control channel resource and data resource, similar to the description in FIG. 5 for a DL control resource region.

When scheduling the UE 406 for uplink data, base station 404 may indicate the set of resources, within the bitmap, for rate-matching around by this particular UE. Thus, the UE may use the semi-static signaling of resources and a dynamic indication of a subset of those resources in order to perform UL rate matching using the available resources in the UL control resource region 206, 212.

In a second example, the UE may rely only a knowledge of a common resource set within the control resource region 206, 212 and may rate match around the defined common resource set. A common control resource set may be a set of control resources that are RRC configured for a UE or a group of UEs. Then, for the remaining resource sets, those symbols that may contain control channel resources or data channel resources, such that the UE may base its rate matching determination upon semi-static and/or dynamic signaling from the base station.

The set of symbols having such variable rate-matching behavior in the UL control resource region 206, 212, may be signaled to UE 406 using RRC or broadcast channels from base station 404.

The sets of resources may have a granularity corresponding to subbands of the control resource region, as described in connection with FIG. 2. In another example, the rate matching may be performed for a finer granularity than a control resource set. For example, rate matching may be performed by a UE within unused resource elements of a control resource set. As other examples, rate matching may be performed for a search space, a PDCCH candidate, a CCE, a REG bundle, a REG, REs, etc. Thus, various levels of granularity of rate matching may be performed, as described herein.

For example, messages in a control subband, e.g., 220 *g*, may be signaled with a number of control channel elements (CCE). Each CCE may comprise N total REs. N may be, e.g., 36. In NR, N may be 48 or 64. In some cases, fractional CCEs may remain that are unallocated. For example, if the total number of CCEs available in a control resource set is 18.5, the 0.5 CCE, which may comprise 18 REs in the example of N=36, is never allocated and may be used for PDSCH. In another example, if there are 19 CCEs, only 18 CCEs might be utilized for control transmissions. The remaining 1 CCE, e.g., which may comprise 36 REs for N=36, may be used for PDSCH.

The granularity of the rate matching may be either implicit, or may be signaled via RRC, Sync, etc.

Although the example, in FIG. 2 illustrates a control resource region 202 separated into 10 control resource sets, different numbers of control resource sets may be used. For example, an OFDM symbol may comprise 6 subbands/ resource sets. The base station 404 may be allocated resource set 5 for common control signals within the DL control resource region. The base station may signal UE 406 via RRC using a bit mask to indicate to the UE that resource sets 1, 2, 3, 4, and 6 may comprise data as well as control signaling. Thus, the base station 404 may indicate to the UE 406 the potential subbands for data transmissions using semi-static signaling. The base station 404 may also provide additional dynamic signaling to the UE regarding rate matching information, or the UE may infer the subbands for rate matching using the semi-static signaling. In the dynamic signaling example, when scheduling the UE for DL data grant on a slot, the base station may inform the UE that among resource sets 1, 2, 3, 4, and 6, the UE may use resource sets 1 and 2 for PDSCH. This dynamic signaling may be via L1 signaling, e.g., DCI signaling. Then, after decoding the grant, the UE may use the information in the grant and the RRC to determine to rate match PDSCH in resource sets 1 and 2.

Figure 6:
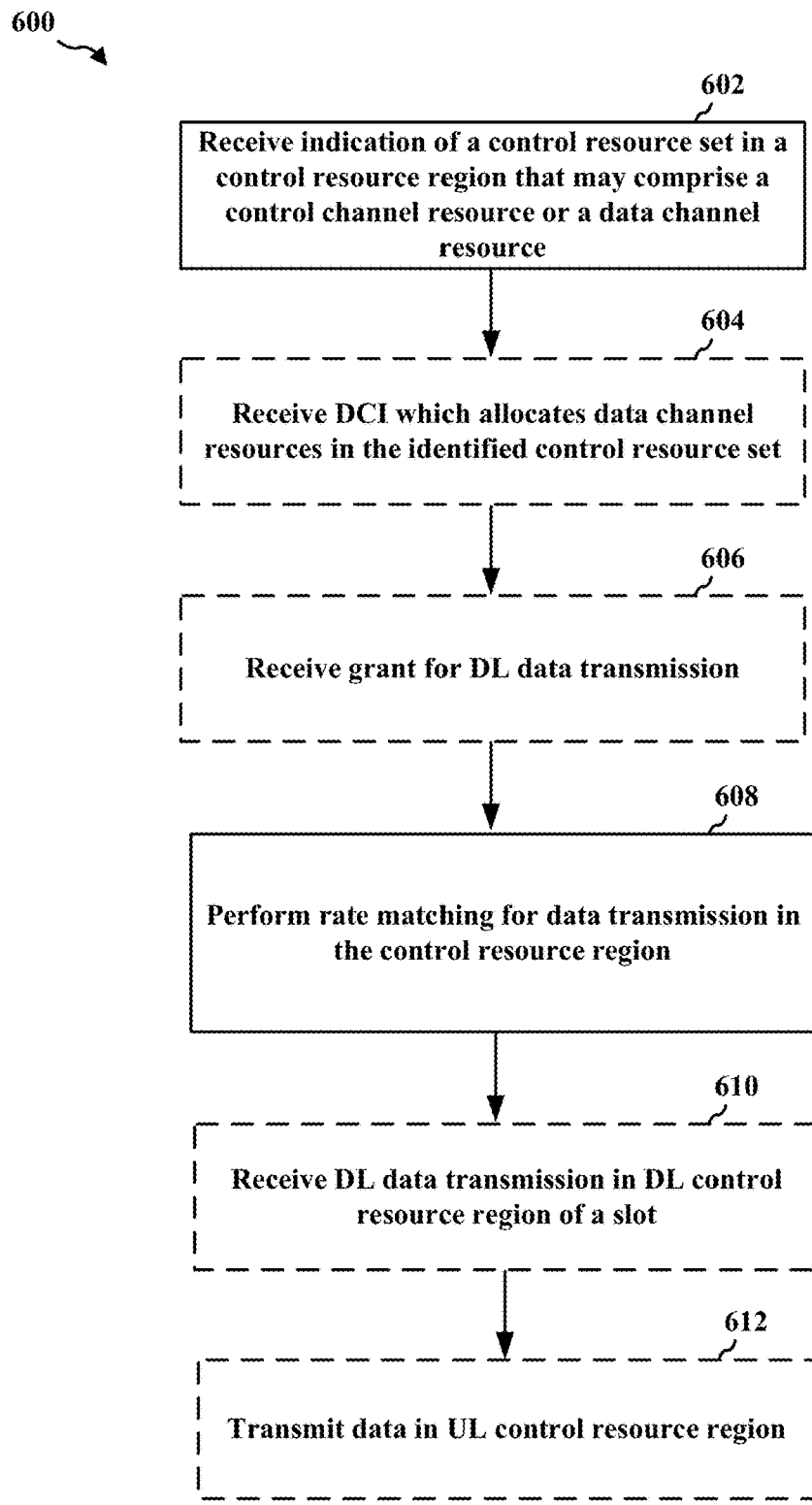
FIG. 6 is a flowchart of a method of wireless communication.

FIG. 6 is a flowchart 600 of a method of wireless communication. The method may be performed by a UE (e.g., the UE 104, 350, 406, 1050, the apparatus 702, 702'). At 602, the UE receives an indication of a control resource set in a control resource region, e.g., 202, 206, 208, 212, of a slot that may comprise a control channel resource or a data channel resource. The control resource region may comprise a plurality of control resource sets configured to provide control information, such as subbands 220a-j or 222a-j illustrated in FIG. 2. Thus, the indication may relate to a set of subbands, e.g., the control resource set comprising at least one subband within the control resource region that may comprise a data resource. In another example with finer granularity, the indication may relate to resource elements within a subband, e.g., with the set of resources comprising at least one resource element, e.g., at least one CCE, within a subband of the control resource region that may comprise a data resource, wherein the other resource elements of the subband are allocated as control resources. Other examples of finer granularity include the identification of resources in a search space, PDCCH candidate, CCE, REG bundle, REG, REs, etc.

The indication may comprise a semi-static indication of the control resource set can be utilized for either the data channel resource or the control channel resource, e.g., radio resource control (RRC) signaling indicating a bitmap of resource set utilization. For example, a '1' may indicate that the corresponding resource set in the plurality of resource sets defined in the control resource region may provide data and/or control channel resources, whereas a '0' may indicate that the corresponding resource set is used only for control channel resources.

The semi-static indication may indicate that the control resource set may be utilized for the data channel resource, for example. The semi-static indication may comprise an indication of the control resource set in the control resource region that may comprise a control channel resource or a data channel resource, or both.

The UE may additionally receive dynamic signaling of resources associated with the control resource set for which the UE should perform rate matching. For example, the indication may be received in UE-specific RRC signaling identifying the control resource set for which the UE should perform rate matching. As indicated at 604, the UE may receive DCI which allocates the data channel resources in the identified control resource set. The DCI may comprise L1 signaling. The indication may comprise UE-specific signaling of resources associated with the control resource set for which the UE should perform rate matching.

The data channel resources may comprise a PDSCH transmission. The UE may perform the at least one of UL rate matching and DL rate matching based on the indication and/or on the dynamic signaling. The dynamic signaling may comprise downlink control information (DCI) in a grant of data channel resources in the slot. The UE may identify an unused portion of the control resource region in order to perform the at least one of uplink (UL) rate matching and downlink (DL) rate matching. The identifying may involve an inference or assumption by the UE based on the identified control resource set.

In another example, the UE may identify, e.g., infer, an unused portion of the control resource region in order to perform the at least one of the UL rate matching and the DL de-rate matching. For example, the UE may receive a grant of DL data channel resources in the slot, at 606 and may identify the unused portion of the control resource region based on the indication and the grant. The identifying the unused portion of the control resource region may be based further on a rate-matching of scheduled DL data channel resources around a downlink control channel on which the grant of the DL data channel resources is received.

The UE may receive a grant of scheduled DL data channel resources, at 606, in the control resource set, and wherein performing the rate matching at 608 comprises rate-matching the scheduled DL data channel resources around a downlink control channel on which the grant is received The indication received at 602 may be received via RRC signaling and/or a broadcast channel from the base station.

At 608, the UE performs rate matching for data transmissions in a control resource region of a slot based at least in part on the indication. Rate matching may include, e.g., UL rate matching and/or DL de-rate matching.

For DL rate matching, the control resource region may comprise DL control resource region, e.g., 202, 208 of the slot. The UE may perform DL de-rate matching based at least in part on the indication. The UE may further perform the DL de-rate matching using the dynamic signaling or using the inference based on the grant. The UE may receive a DL data transmission in a resource within the set of resources in the DL control resource region 202, 208 of the slot at 610.

For UL rate matching, the control resource region may comprise an UL control resource region 206, 212 of the slot. The UE may perform UL rate matching based at least in part on the indication. The UE may further perform the UL rate matching using the dynamic signaling or using the inference based on the grant. For example, the UE may use a resource within the indicated resource set to transmit data in the UL control resource region 206, 212 of the slot at 612.

The control resource region may comprise a plurality of resource sets including at least one common control resource set. For example, the control resource region may comprise a plurality of subbands with at least one allocated to a common control resource set. Other subbands may be allocated to UE specific control resource sets. The UL rate matching or the DL de-rate matching may comprise rate matching around the at least one common resource set. The UE may determine whether to rate match around the remaining resource sets of the control resource region.

The UE may perform the UL rate matching or DL de-rate matching for an aggregation of slots.

Figure 7:
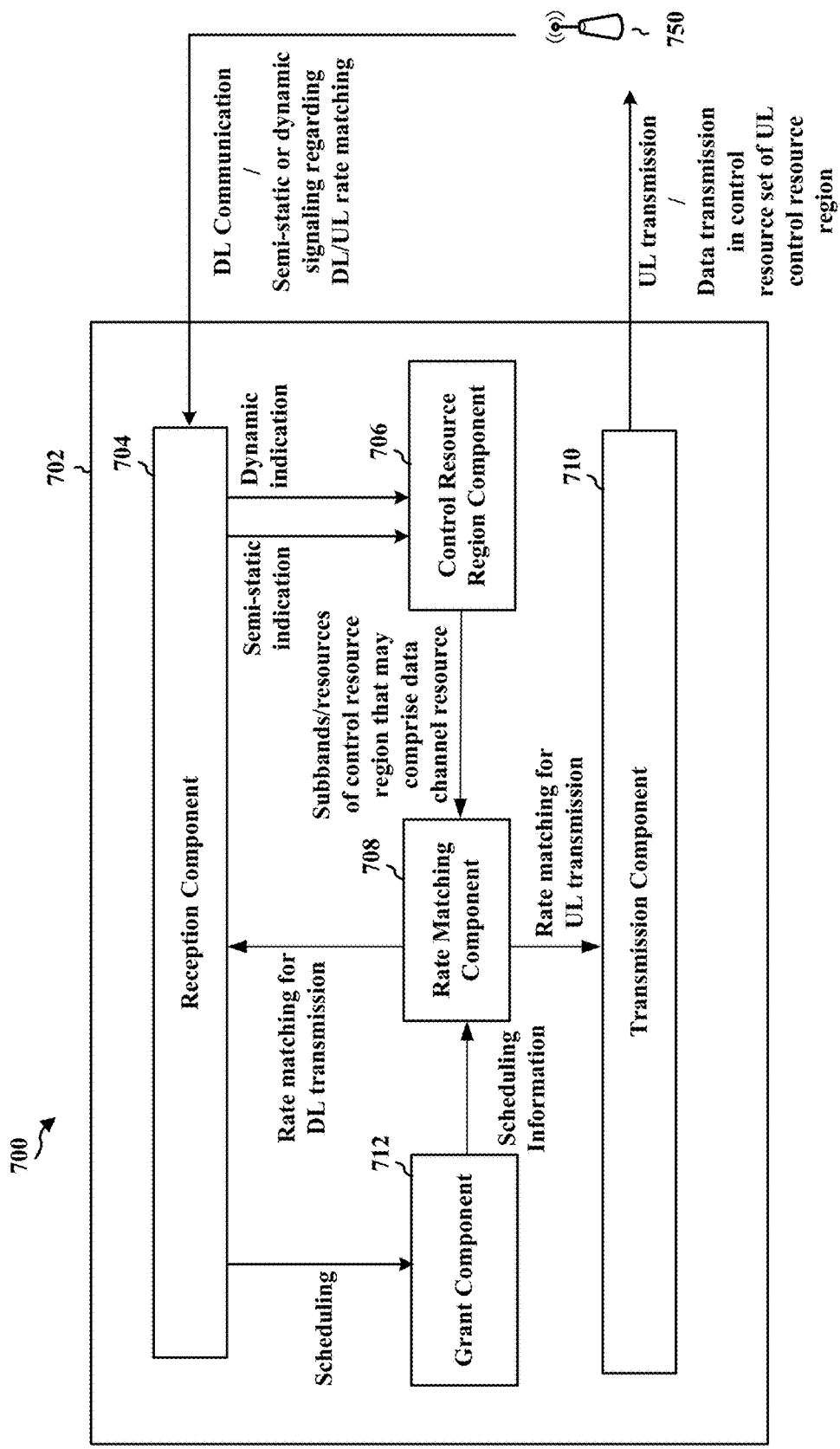
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE, e.g., UE 104, 350, 406. The apparatus includes a reception component 704 that receives DL communication from base station 750, a control resource region component 706 that receives an indication of a control resource set in a control resource region of a slot that may comprise a control channel resource or a data resource, wherein the control resource region comprises a plurality of resource sets configured to provide control information and a rate matching component 708 that performs UL rate matching or DL de-rate matching for data transmissions in a control resource region of a slot based at least in part on the indication. The control resource region component 706 may receive a semi-static indication and/or dynamic signaling of resources for which the apparatus should perform rate matching, as described in connection with FIG. 6. The apparatus may further comprise a grant component 712 configured to receive a grant of DL data channel resources in the slot. The apparatus 702 may identify, or infer, the unused portion of the control resource region based on the semi-static signal and the grant. The rate matching performed by the rate matching component 708 may comprise rate-matching the scheduled DL data channel resources around a downlink control channel on which the grant is received The apparatus comprises a transmission component 710 that transmits UL communication to base station 750, e.g., according to UL rate matching determined by the rate matching component 708. Thus, the transmission component may transmit data in an UL control resource region of a slot based on UL rate matching based at least in part on the indication, including using a resource within the control resource set to transmit a data channel resource. The reception component may receive DL communication from base station 750 according to the DL rate matching determine at rate matching component 708, including receiving data in a control resource region of a slot.

The apparatus may include additional components that perform each of the blocks of the algorithm in the aforementioned flowchart of FIG. 6 and the aspects of FIGS. 2, 4, and 5. As such, each block in the aforementioned flowchart of FIG. 6 and the aspects of FIGS. 2, 4, and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
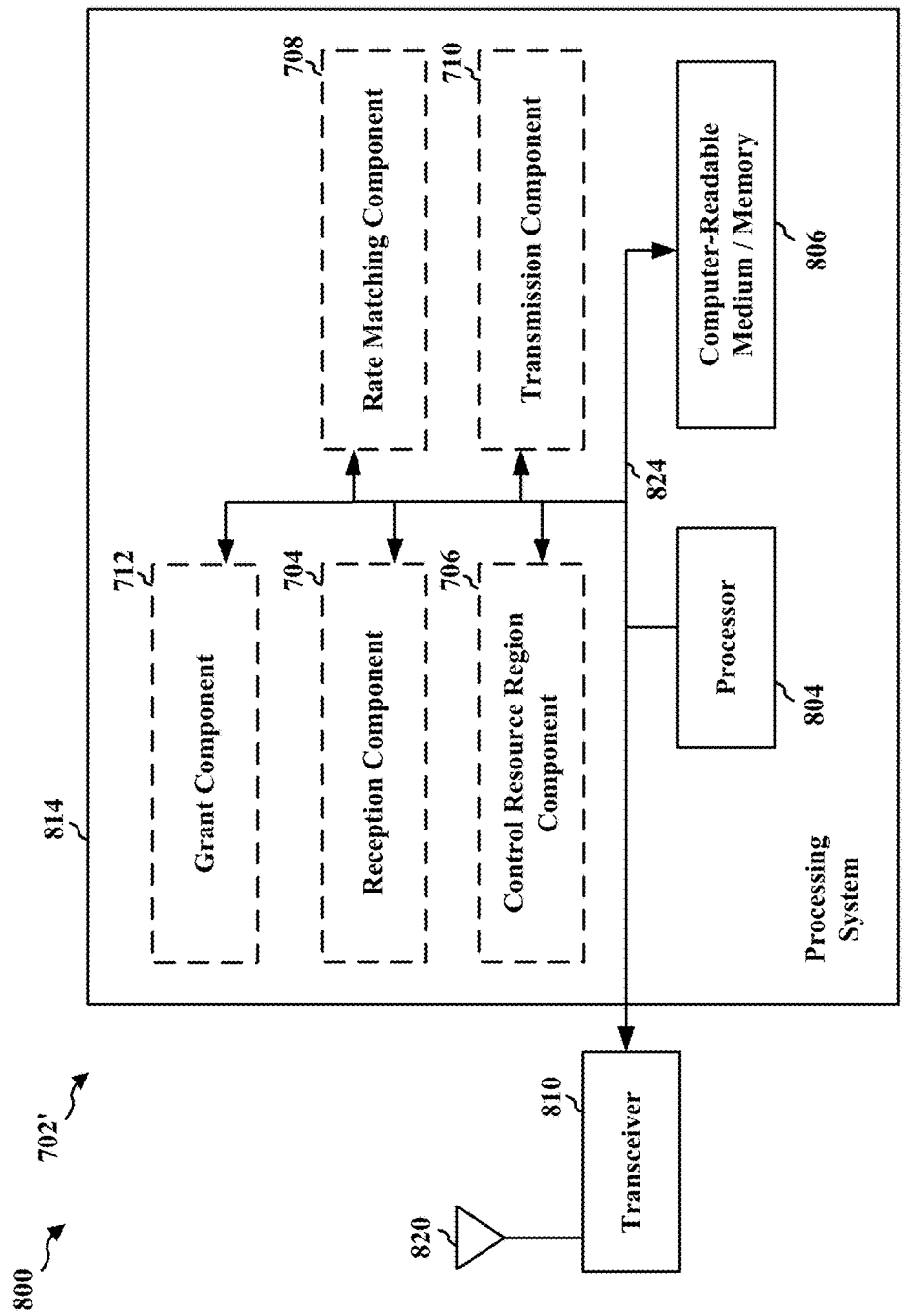
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for receiving (e.g., 704, 706) an indication of a set of resources in a control resource region of a slot that may comprise a data resource, means for performing UL rate matching (e.g., 708), means for performing DL rate matching (e.g., 708), means for receiving dynamic scheduling of resources (e.g., 706), means for receiving scheduling for DL data (e.g., 712), means for receiving (e.g., 704) a data transmission in a resource of a DL control resource region, and means for using a resource in an UL control resource region to transmit data (e.g., 710). The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
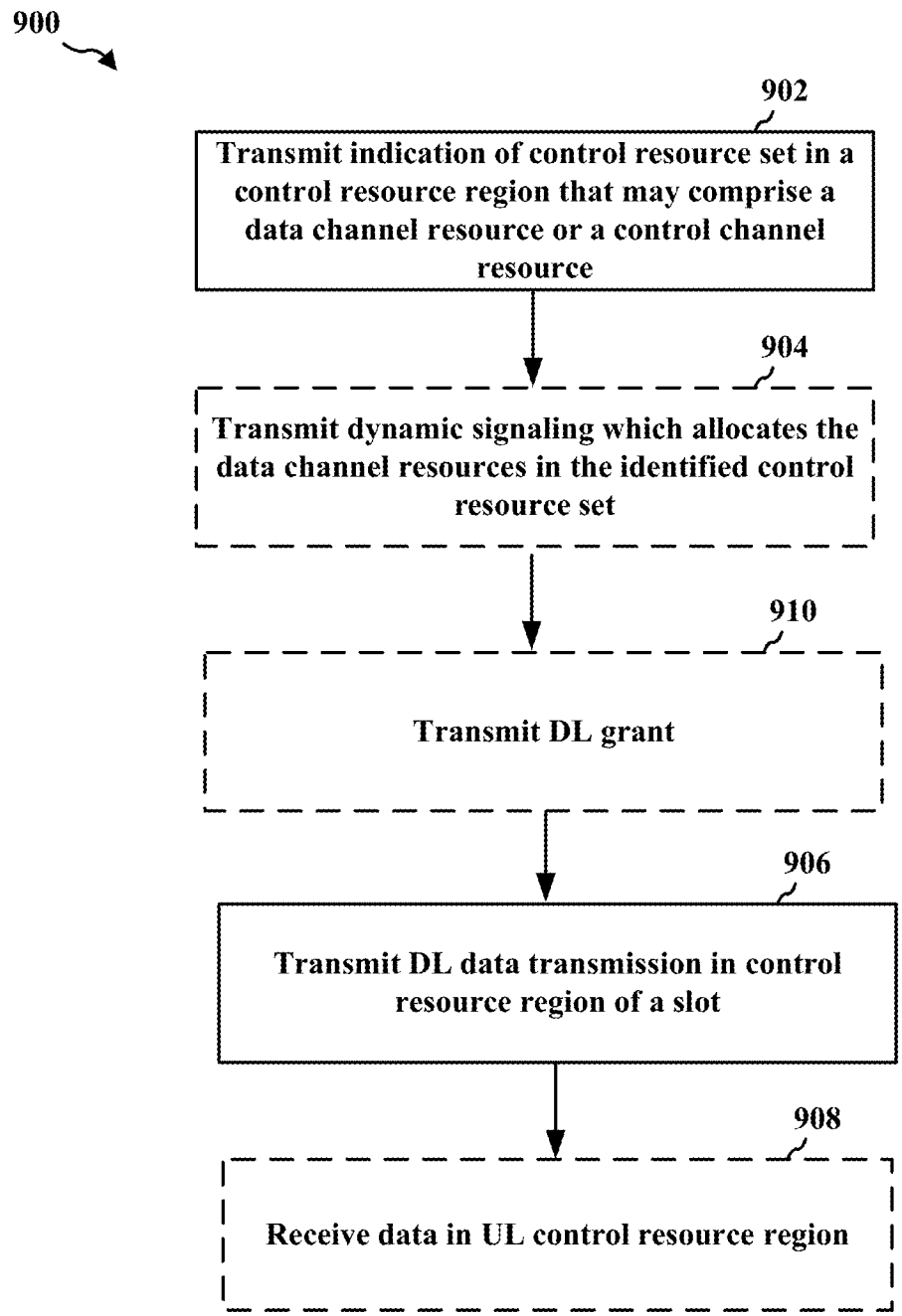
FIG. 9 is a flowchart of a method of wireless communication.

FIG. 9 is a flowchart 900 of a method of wireless communication. The method may be performed by an base station (e.g., the base station 102, 180, 310, 404, 750, the apparatus 1002/1002'). At 902, the base station transmits an indication of a control resource set in a control resource region, e.g., 202, 206, 208, 212, of a slot that may comprise a control channel resource or a data channel resource. The control resource region may comprise a plurality of resource sets configured to provide control information, such as subbands 220a-j, 222a-j illustrated in FIG. 2. Thus, the indication may relate to a set of subbands, e.g., the control resource set comprising at least one subband within the control resource region that may comprise a data channel resource. In another example, the indication may relate to resources within a subband, e.g., with the a control resource set comprising at least one resource element within a subband of the control resource region that may comprise a data channel resource, wherein the other resource elements of the subband are allocated as control channel resources.

The indication may comprise a semi-static indication of the control resource set in the control resource region that may comprise a control channel resource or a data resource, e.g., RRC signaling. The RRC signaling may indicate a bitmap of resource set utilization in the control resource region. The indication may be received in UE-specific RRC signaling of resources identifying the control resource set for which the UE should perform rate matching.

The base station may additionally transmit, at 904, dynamic signaling of resources associated with the control resource set. The base station may transmit, e.g., downlink control information (DCI) which allocates data channel resources in the identified control resource set. The DCI signaling may comprise L1 signaling. In one example, the base station may transmit a bit mask, for which the UE should perform rate matching in accordance with the semi-static indication. For example, the dynamic signaling may comprise DCI in a grant of channel resources in the slot. The UE may perform the at least one of UL rate matching and DL de-rate matching based on the indication and on the dynamic signaling.

The control resource set may comprise at least one resource element within a subband of the control resource region that may comprise a control channel resource or a data channel resource, wherein the other resource elements of the subband are allocated as control resources.

The base station may further transmit, at 910, a grant of scheduled DL data channel resources in the control resource set. This may enable the UE to perform rate matching comprises rate-matching the scheduled DL data channel resources around a downlink control channel on which the grant is received.

At 908, the base station transmits a data channel within at least a part of the control resource set in the control resource region of the slot. At 910, the base station may optionally receive data in an UL control resource region of a slot, as described in connection with FIGS. 4-7. Optional aspects in FIGS. 6 and 9 are illustrated using a dashed line.

Figure 10:
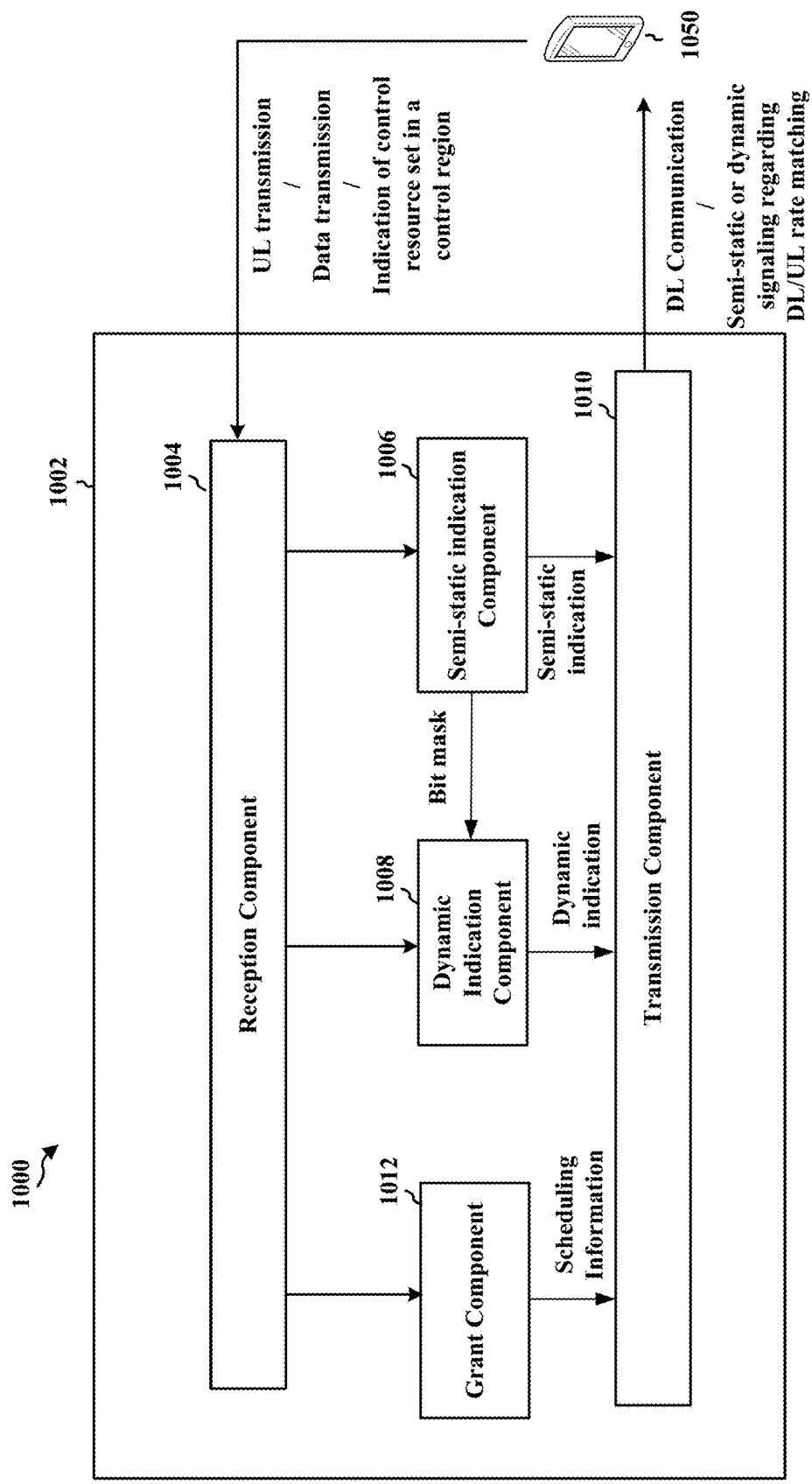
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an base station. The apparatus includes a reception component 1004 that receives UL communication from UE 1050, including data transmitted in an UL control resource region of a slot and a transmission component 1010 that transmits DL communication including both control transmissions and data transmission to a UE 1050. The apparatus includes a semi-static indication component 1006 that a component 1006 that transmits to UE 1050, via transmission component 1010, an indication of a set of resources in a control resource region of a slot that may comprise a data resource. The apparatus may include a dynamic indication component 1008 configured to transmit dynamic signaling of resources within the indication for which a user equipment should perform at least one of downlink rate matching and UL rate matching. The apparatus may comprise a grant component 1012 configured to configure and transmit a grant of DL data channel resources in the slot to UE 1050. The apparatus may include additional components that perform each of the blocks of the algorithm in the aforementioned flowchart of FIG. 9 and the aspects of FIGS. 2, 4, and 5. As such, each block in the aforementioned flowchart of FIG. 9 and the aspects of FIGS. 2, 4, and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
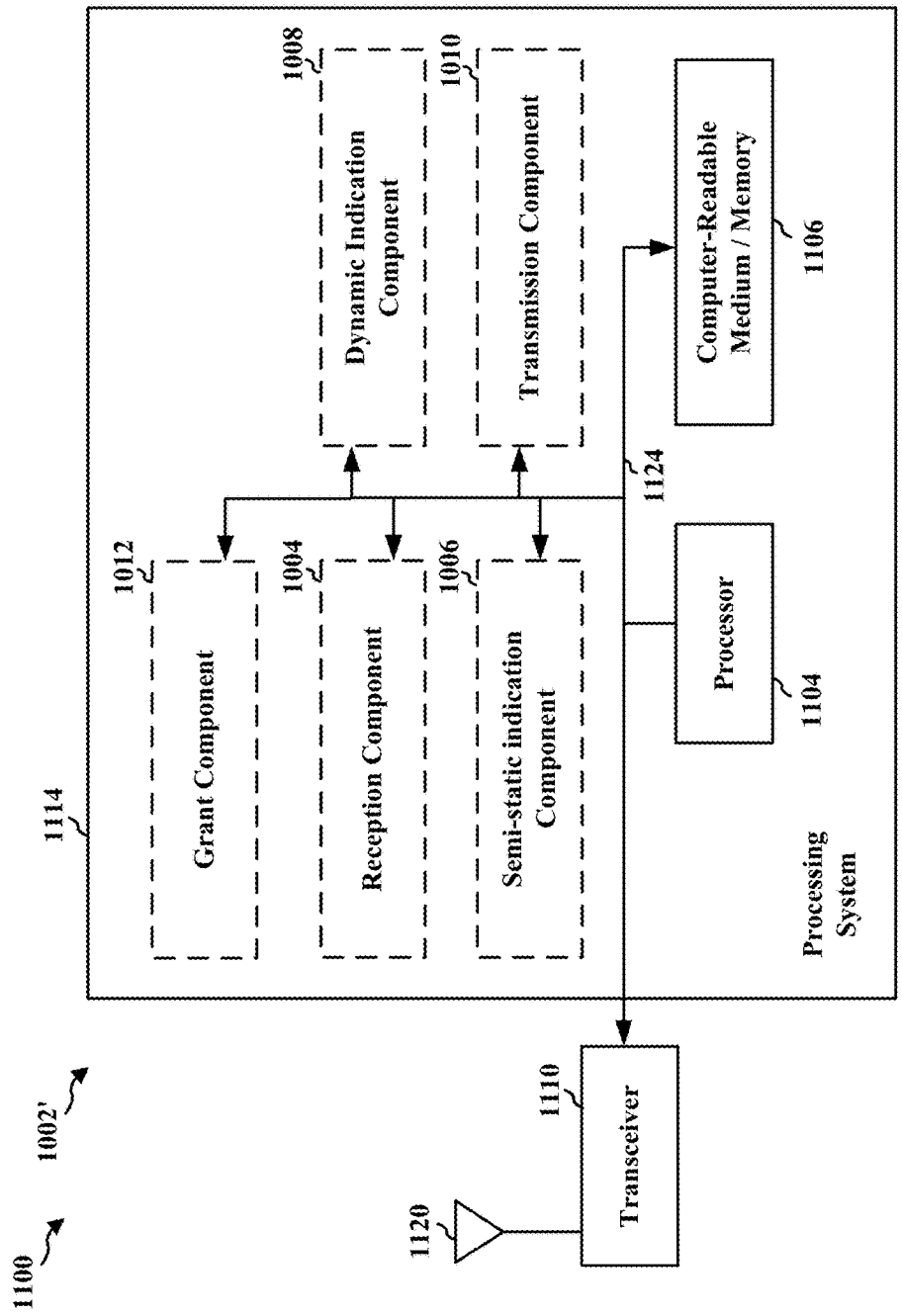
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for transmitting (e.g., 1010) an indication of a set of resources in a control resource region of a slot that may comprise a control channel resource or a data resource, means for transmitting data within a resource in a control resource region of a slot, means for transmitting (e.g., 1008) dynamic signaling of resources within the indication for which a user equipment should perform at least one of downlink rate matching and UL rate matching, means for transmitting DCI (e.g., 1008) which allocates data channel resources, means for transmitting (e.g., 1012, 1010) a grant to the UE for data, and means for receiving (e.g., 1004) data in an UL control portion of a slot. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   communicating with a base station in a slot having a control resource region in which control channel information is transmitted by the base station and a data resource region in which data channel information is transmitted by the base station, wherein the control resource region comprises a plurality of control resource sets;
   receiving a semi-static indication comprised in radio resource control (RRC) signaling, wherein the semi-static indication indicates a control resource set in the plurality of control resource sets that can be utilized for a data channel resource or a control channel resource;
   receiving a dynamic indication comprised in downlink control information (DCI) that dynamically allocates data channel resources in the control resource set in the plurality of control resource sets comprised in the control resource region of the slot;
   performing de-rate matching for a downlink (DL) data transmission in the data channel based at least in part on the semi-static indication and the dynamic indication allocating the data channel resources for the UE in the slot; and
   receiving, from the base station, the DL data transmission in at least one resource of the control resource set in the control resource region based on the de-rate matching.

2. The method of claim 1, wherein the semi-static indication is a UE-specific indication that identifies the control resource set in the plurality of control resource sets as a control resource set for which the UE should perform de-rate matching.

3. The method of claim 1, wherein the dynamic indication is UE-specific and signals resources associated with the control resource set for which the UE should perform de-rate matching.

4. The method of claim 1, wherein the DL data transmission comprises a Physical Downlink Shared Channel (PDSCH) transmission.

5. The method of claim 1, further comprising:
   receiving a grant of data channel resources in the control resource set, and wherein performing the de-rate matching comprises de-rate matching the DL data transmission around a downlink control channel on which the grant is received.

6. The method of claim 1, wherein the UE identifies an unused portion of the control resource region to perform the de-rate matching for the DL data transmission.

7. The method of claim 6, further comprising:
   receiving a grant of DL data channel resources in the slot, wherein the UE identifies the unused portion of the control resource region based on the semi-static indication and the grant.

8. The method of claim 7, wherein identifying the unused portion of the control resource region is based further on a rate-matching of scheduled DL data channel resources around a downlink control channel on which the grant of the DL data channel resources is received.

9. The method of claim 1, wherein the control resource set comprises a set of resource elements.

10. The method of claim 1, wherein the plurality of control resource sets includes at least one common control resource set, and wherein performing the de-rate matching comprises de-rate matching around the at least one common resource set and determining whether to de-rate match around remaining control resource sets in the plurality of control resource sets of the control resource region.

11. The method of claim 1, wherein the performing de-rate matching comprises performing DL de-rate matching in common for an aggregation of slots.

12. The method of claim 1, wherein the control resource set comprises at least one subband within the control resource region that may comprise the control channel resource or the data channel resource.

13. The method of claim 1, wherein the RRC signaling indicates a bitmap of control resource set utilization in the control resource region.

14. The method of claim 1, wherein the semi-static indication comprises a bitmap of non-contiguous frequency resources.

15. An apparatus for wireless communication at a user equipment (UE), comprising:
a memory; and
at least one processor coupled to the memory and configured to cause the apparatus to:
communicate with a base station in a slot having a control resource region in which control channel information is transmitted by the base station and a data resource region in which data channel information is transmitted by the base station, wherein the control resource region comprises a plurality of control resource sets;
receive a semi-static indication comprised in radio resource control (RRC) signaling, wherein the semi-static indication indicates a control resource set in the plurality of control resource sets that can be utilized for a data channel resource or a control channel resource;
receive a dynamic indication comprised in downlink control information (DCI) that dynamically allocates data channel resources in the control resource set in the plurality of control resource sets comprised in the control resource region of the slot;
perform de-rate matching for a downlink (DL) data transmission in the data channel based at least in part on the semi-static indication and the dynamic indication allocating the data channel resources for the UE in the slot; and
receive, from the base station, the DL data transmission in at least one resource of the control resource set in the control resource region based on the de-rate matching.

16. A method of wireless communication at a base station, comprising:
communicating with a user equipment (UE) in a slot having a control resource region in which control channel information is transmitted by the base station and a data resource region in which data channel information is transmitted by the base station, wherein the control resource region comprises a plurality of control resource sets;
transmitting a semi-static indication comprised in radio resource control (RRC) signaling, wherein the semi-static indication indicates a control resource set in the plurality of control resource sets that can be utilized for a data channel resource or a control channel resource;
transmitting a dynamic indication comprised in downlink control information (DCI) that dynamically allocates data channel resources in the control resource set in the plurality of control resource sets comprised in the control resource region of the slot; and
transmitting data within the control resource set in the control resource region of the slot in accordance with the semi-static indication and the dynamic indication.

17. The method of claim 16, wherein the semi-static indication is UE-specific and identifies the control resource set in the plurality of control resource sets as a control resource set for which the UE should perform de-rate matching.

18. The method of claim 16, wherein the dynamic indication comprises a UE-specific signaling of resources that identifies the control resource set as a control resource set for which the UE should perform de-rate matching.

19. The method of claim 16, wherein the transmitting comprises a Physical Downlink Shared Channel (PDSCH) transmission.

20. The method of claim 16, wherein the control resource set comprises a subset of resource elements within another control resource set in the plurality of control resource sets.

21. The method of claim 16, wherein the control resource set comprises at least one resource element within a subband of the control resource region that may comprise the control channel resource or the data channel resource, and wherein other resource elements of the subband are allocated as control channel resources.

22. An apparatus for wireless communication at a base station, comprising:
a memory; and
at least one processor coupled to the memory and configured to cause the apparatus to:
communicate with a user equipment (UE) in a slot having a control resource region in which control channel information is transmitted by the base station and a data resource region in which data channel information is transmitted by the base station, wherein the control resource region comprises a plurality of control resource sets;
transmit a semi-static indication comprised in radio resource control (RRC) signaling, wherein the semi-static indication indicates a control resource set in the plurality of control resource sets that can be utilized for a data channel resource or a control channel resource;
transmit a dynamic indication comprised in downlink control information (DCI) that dynamically allocates data channel resources in the control resource set in the plurality of control resource sets comprised in the control resource region of the slot; and
transmit data within the control resource set in the control resource region of the slot in accordance with the semi-static indication and the dynamic indication.

* * * * *